US009751326B2

(12) United States Patent
Moorlag et al.

(10) Patent No.: US 9,751,326 B2
(45) Date of Patent: Sep. 5, 2017

(54) HYPERBRANCHED INK COMPOSITIONS FOR CONTROLLED DIMENSIONAL CHANGE AND LOW ENERGY CURING

(71) Applicant: XEROX CORPORATION, Norwalk, CT (US)

(72) Inventors: Carolyn Moorlag, Mississauga (CA); C. Geoffrey Allen, Waterdown (CA); Marcel P. Breton, Mississauga (CA); Mihaela Maria Birau, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/620,945

(22) Filed: Feb. 12, 2015

(65) Prior Publication Data

US 2016/0237290 A1    Aug. 18, 2016

(51) Int. Cl.
*B41J 2/21*          (2006.01)
*C09D 11/101*        (2014.01)
(Continued)

(52) U.S. Cl.
CPC .......... *B41J 2/2107* (2013.01); *C09D 11/037* (2013.01); *C09D 11/101* (2013.01); *C09D 135/02* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36;
C09D 11/40; C09D 11/30; C09D 11/38; C09D 11/322; C09D 11/328; C09D 11/101; C09D 11/005; C09D 11/54; C09D 11/52;
(Continued)

(56) References Cited

U.S. PATENT DOCUMENTS 3,945,957 A    3/1976  Noshiro et al.
4,304,601 A   12/1981  Sharp
(Continued)

FOREIGN PATENT DOCUMENTS

EP    1235863 B1    1/2005
JP    03069954 A    3/1991
(Continued)

OTHER PUBLICATIONS

Allen, et al., "Acrylate Ink Compositions for Ink-Based Digital Lithographic Printing", U.S. Appl. No. 14/645,153, filed Mar. 11, 2015.
(Continued)

*Primary Examiner* — Manish S Shah
(74) *Attorney, Agent, or Firm* — MH2 Technology Law Group LLP

(57) ABSTRACT

Disclosed herein are ink compositions including at least one hyperbranched oligomer present in an amount ranging from about 3% to about 20% and having a functionality ranging from about 6 to about 40; at least one pigment present in an amount of at least about 10%; and at least one photoinitiator present in an amount ranging from 5% to 10%. Further provided herein are methods of printing using a variable data digital lithographic printing device.

14 Claims, 3 Drawing Sheets

(51) Int. Cl.
*C09D 11/037* (2014.01)
*C09D 135/02* (2006.01)

(58) Field of Classification Search
CPC .... B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

| | | | |
|---|---|---|---|
| 4,403,550 A | 9/1983 | Sharp | |
| 4,445,432 A | 5/1984 | Ford, Jr. et al. | |
| 4,711,818 A | 12/1987 | Henry | |
| 4,806,391 A | 2/1989 | Shorin | |
| 4,911,999 A | 3/1990 | Legere | |
| 4,927,180 A | 5/1990 | Trundle et al. | |
| 5,085,698 A | 2/1992 | Ma et al. | |
| 5,502,476 A | 3/1996 | Neal et al. | |
| 5,834,118 A | 11/1998 | Ranby et al. | |
| 5,886,067 A | 3/1999 | Li et al. | |
| 5,977,202 A * | 11/1999 | Chawla | C09D 201/10 428/378 |
| 6,114,489 A | 9/2000 | Vicari et al. | |
| 6,329,446 B1 | 12/2001 | Sacripante et al. | |
| 6,348,561 B1 | 2/2002 | Mychajlowskij et al. | |
| 6,664,015 B1 | 12/2003 | Sacripante et al. | |
| 6,896,937 B2 | 5/2005 | Woudenberg | |
| 7,022,752 B2 | 4/2006 | Hayashi et al. | |
| 7,151,153 B2 | 12/2006 | Bruchmann et al. | |
| 7,202,006 B2 | 4/2007 | Chopra et al. | |
| 7,208,258 B2 | 4/2007 | Gervasi et al. | |
| 7,322,688 B2 | 1/2008 | Woudenberg | |
| 7,538,070 B2 | 5/2009 | Iftime et al. | |
| 7,556,844 B2 | 7/2009 | Iftime et al. | |
| 7,674,326 B2 | 3/2010 | Iftime et al. | |
| 7,708,396 B2 | 5/2010 | Iftime et al. | |
| 7,718,325 B2 | 5/2010 | Norsten et al. | |
| 7,723,398 B2 | 5/2010 | Ilg et al. | |
| 7,909,924 B2 | 3/2011 | Krishnan et al. | |
| 7,964,271 B2 | 6/2011 | Norsten et al. | |
| 8,001,889 B2 | 8/2011 | Gaugenrieder et al. | |
| 8,124,791 B2 * | 2/2012 | Shinjo | C09D 11/101 548/520 |
| 8,158,693 B2 | 4/2012 | Breton et al. | |
| 8,222,313 B2 | 7/2012 | Iftime et al. | |
| 8,771,787 B2 | 7/2014 | Breton et al. | |
| 8,895,400 B2 | 11/2014 | Seo et al. | |
| 8,934,823 B1 | 1/2015 | Pickering et al. | |
| 9,011,594 B1 | 4/2015 | Kanungo et al. | |
| 9,193,209 B2 | 11/2015 | Dooley et al. | |
| 9,283,795 B1 | 3/2016 | Kanungo et al. | |
| 9,359,512 B2 | 6/2016 | Moorlag et al. | |
| 9,387,661 B2 | 7/2016 | Zirilli | |
| 9,422,436 B2 | 8/2016 | Birau et al. | |
| 2002/0040073 A1 | 4/2002 | Stone et al. | |
| 2002/0107303 A1 | 8/2002 | Miyabashi et al. | |
| 2003/0003323 A1 | 1/2003 | Murakami et al. | |
| 2003/0021961 A1 | 1/2003 | Ylitalo et al. | |
| 2003/0044691 A1 | 3/2003 | Setthachayanon et al. | |
| 2003/0073762 A1 | 4/2003 | Jung et al. | |
| 2003/0149130 A1 | 8/2003 | Kondo | |
| 2004/0063809 A1 | 4/2004 | Fu et al. | |
| 2004/0132862 A1 | 7/2004 | Woudenberg | |
| 2004/0233465 A1 | 11/2004 | Coyle et al. | |
| 2005/0166783 A1 | 8/2005 | Ylitalo et al. | |
| 2006/0054040 A1 * | 3/2006 | Daems | B41C 1/003 101/463.1 |
| 2006/0110611 A1 | 5/2006 | Badesha et al. | |
| 2007/0166479 A1 | 7/2007 | Drake et al. | |
| 2007/0259986 A1 | 11/2007 | Elwakil et al. | |
| 2008/0090929 A1 * | 4/2008 | Wilson | C09D 11/101 522/75 |
| 2008/0139743 A1 | 6/2008 | Krishnan et al. | |
| 2008/0241485 A1 | 10/2008 | Shimohara et al. | |
| 2008/0258345 A1 | 10/2008 | Bens et al. | |
| 2008/0317957 A1 | 12/2008 | Overbeek et al. | |
| 2009/0038506 A1 | 2/2009 | Odell et al. | |
| 2009/0104373 A1 | 4/2009 | Vanbesien et al. | |
| 2009/0110843 A1 | 4/2009 | Halahmi et al. | |
| 2009/0135239 A1 | 5/2009 | Chretien et al. | |
| 2009/0280302 A1 | 11/2009 | Fukumoto et al. | |
| 2010/0020123 A1 | 1/2010 | Hirato | |
| 2010/0067056 A1 | 3/2010 | Rich et al. | |
| 2010/0214373 A1 | 8/2010 | Carr et al. | |
| 2010/0239777 A1 * | 9/2010 | Nakajima | C09D 11/322 427/508 |
| 2011/0045199 A1 | 2/2011 | Cong | |
| 2011/0141187 A1 * | 6/2011 | Takabayashi | B41M 5/0023 347/20 |
| 2011/0188023 A1 | 8/2011 | Rondon et al. | |
| 2011/0196058 A1 | 8/2011 | Breton et al. | |
| 2011/0262711 A1 | 10/2011 | Chopra et al. | |
| 2012/0040156 A1 | 2/2012 | Ohashi et al. | |
| 2012/0103212 A1 | 5/2012 | Stowe et al. | |
| 2012/0103213 A1 | 5/2012 | Stowe et al. | |
| 2012/0103218 A1 | 5/2012 | Stowe et al. | |
| 2012/0103221 A1 | 5/2012 | Stowe et al. | |
| 2012/0157561 A1 | 6/2012 | Gould et al. | |
| 2012/0309896 A1 | 12/2012 | Carlini et al. | |
| 2013/0050366 A1 | 2/2013 | Sasada et al. | |
| 2013/0085208 A1 | 4/2013 | Norikoshi et al. | |
| 2013/0104756 A1 | 5/2013 | Stowe et al. | |
| 2013/0305946 A1 | 11/2013 | Iftime et al. | |
| 2013/0305947 A1 | 11/2013 | Iftime et al. | |
| 2013/0307913 A1 * | 11/2013 | Kawashima | B41J 2/155 347/100 |
| 2013/0310479 A1 | 11/2013 | Lee et al. | |
| 2013/0310517 A1 | 11/2013 | Lee et al. | |
| 2013/0324653 A1 | 12/2013 | Bollard et al. | |
| 2014/0235752 A1 | 8/2014 | Gharapetian et al. | |
| 2014/0333704 A1 | 11/2014 | Takabayashi et al. | |
| 2014/0340455 A1 | 11/2014 | Breton et al. | |
| 2015/0077501 A1 | 3/2015 | Breton et al. | |
| 2015/0093690 A1 | 4/2015 | Shimura et al. | |
| 2015/0116416 A1 | 4/2015 | Belelie et al. | |
| 2015/0170498 A1 | 6/2015 | Beggs et al. | |
| 2015/0174887 A1 | 6/2015 | Moorlag et al. | |
| 2015/0175820 A1 | 6/2015 | Breton et al. | |
| 2015/0175821 A1 | 6/2015 | Moorlag et al. | |
| 2016/0090490 A1 | 3/2016 | Moorlag et al. | |
| 2016/0176185 A1 | 6/2016 | Kanungo et al. | |
| 2016/0177113 A1 | 6/2016 | Allen et al. | |
| 2016/0222231 A1 | 8/2016 | Allen et al. | |
| 2016/0230027 A1 | 8/2016 | Birau et al. | |
| 2016/0257829 A1 | 9/2016 | Breton et al. | |
| 2016/0264798 A1 | 9/2016 | Allen et al. | |
| 2016/0333205 A1 | 11/2016 | Lee et al. | |

FOREIGN PATENT DOCUMENTS

| | | | |
|---|---|---|---|
| JP | 2011208019 A * | 10/2011 | ................ B41J 2/01 |
| WO | 2013119539 A1 | 8/2013 | |

OTHER PUBLICATIONS

Breton, et al., "Process Black Ink Compositions and Uses Thereof", U.S. Appl. No. 14/635,679, filed Mar. 2, 2015.
Communication dated May 4, 2015, issued in EP Appl. No. 14196839.6, pp. 1-5.
Henri Bouas-Laurent, et al., Organic Photochromism (IUPAC Technical Report), Pure Appl. Chem., vol. 73, No. 4, pp. 639-665, 2001.
Leach, et al., "The Printing Ink Manual, 5th Edition", Blue Print, New York, pp. 84-86, 516, 525, 544-550, 724-726 (1993).
Thesis of Enrique Michel-Sanchez, Impact of Particle Morphology on the Rheology of PCC-Based Coatings, Aug. 2005.
Stowe, et al., "Methods for Rejuvenating an Imaging Member of an Ink-Based Digital Printing System", U.S. Appl. No. 15/240,691, filed Aug. 18, 2016.
Badesha, et al. "Fluorosilicone composite and Formulation Process for Imaging Plate", U.S. Appl. No. 15/222,364, filed Jul. 28, 2016.

(56) References Cited

OTHER PUBLICATIONS

Birau, et al. "Ink Composition and Method of Printing", U.S. Appl. No. 15/377,881, filed Dec. 13, 2016.
Allen, et al., "Acrylate Ink Compositions for Ink-Based Digital Lithographic Printing", U.S. Appl. No. 15/435,098, filed Feb. 16, 2017.
Breton, et al. "Aqueous Dispersible Polymer Inks", U.S. Appl. 15/442,260, filed Feb. 24, 2017.

\* cited by examiner

HYPERBRANCHED INK COMPOSITIONS FOR CONTROLLED DIMENSIONAL CHANGE AND LOW ENERGY CURING

DETAILED DESCRIPTION

Field of the Disclosure

This disclosure relates generally to ink compositions for printing on substrates. In particular, the disclosure relates to ink compositions comprising hyperbranched oligomers useful for digital lithographic printing systems.

Background

In typical lithographic printing systems, a printing plate is formed to have "image regions" formed of a hydrophobic/oleophilic material and "non-image regions" formed of a hydrophilic/oleophobic material. The image regions correspond to the areas on the final print (i.e., the target substrate) that are occupied by ink, whereas the non-image regions correspond to the areas on the final print that are not occupied by said ink. The hydrophilic regions accept and are readily wetted by a water-based fluid, commonly referred to as a dampening fluid or fountain fluid (typically comprising water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system.

Typical lithographic and offset printing techniques utilize plates which are permanently patterned, and are therefore useful only when printing a large number of copies of the same image (i.e., long print runs), such as magazines, newspapers, and the like. However, variable data digital lithography or digital offset lithography has been developed as a system which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Digital offset lithography printing systems use offset-type inks that are specifically designed and optimized to be compatible with various subsystems, including ink delivery systems and laser imaging systems, to enable high quality digital printing at high speeds. Related art offset-type inks suffer shortfalls including, but not limited to, (1) being difficult to deliver via preferred inking systems, including anilox roller-type inking systems, (2) being soluble in commonly-employed dampening fluids, such as octamethylcyclotetrasiloxane (D4), (3) causing image background and/or ghosting issues, (4) being costly to manufacture and use, and (5) exhibiting inefficient image transfer. Moreover, it may be desirable to cure and/or pre-cure the ink composition, which can require the use of a substantial amount of energy, depending on the cure requirements of the ink. Ink compositions may also shrink upon drying, leading to image deformation on the final substrate. These shortfalls, individually and in combination, tend to narrow a design space within which related art inks are usable in the context of digital offset lithography printing systems.

SUMMARY

Accordingly, there is a need to develop inks that exhibit improved qualities and that may address one or all of the above-identified shortfalls. Extensive experimentation has revealed that ink compositions comprising hyberbranched oligomers may provide, among other benefits, improved curing and reduced shrinkage of an image, thereby enhancing print quality on a variety of substrates, as well as more efficient usage of energy. There is a need for a printing technology that achieves excellent printing performance on a variety of substrates at a low ink manufacturing cost.

Ink compositions should meet various sub-system requirements imposed by ink-based digital printing systems that are configured for variable data lithographic printing. These requirements include wettability, releasability from a reimageable surface of an imaging member, and compatibility with non-aqueous dampening fluids configured for use with ink-based digital printing methods and systems.

Ink compositions comprising at least one hyperbranched oligmer are provided herein that meet the foregoing requirements. The disclosed ink compositions may be effectively delivered from an anilox roller-type delivery system to a reimageable surface of an imaging member during a variable data offset printing operation in which images on the reimageable surface are changeable between cycles of the imaging member. Ink compositions comprising at least one hyperbranched oligomer in accordance with disclosed embodiments may be curable inks that are formed from non-polar acrylate inks and exhibit stable rheology that enables delivery using an anilox roll delivery system, while demonstrating desirable transferability to a reimageable surface of an imaging member.

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Disclosed herein are ink compositions comprising at least one hyperbranched oligomer present in an amount ranging from about 3% to about 20%, such as from about 5% to about 10%, and having a functionality ranging from about 6 to about 40, such as from about 10 to about 20, at least one pigment present in an amount of at least about 10%, and at least one photoinitiator present in an amount ranging from about 5% to about 10%.

In certain embodiments the ink compositions disclosed herein may further comprise at least one ingredient chosen from acrylate monomers, dispersants, rheology modifiers, and UV stabilizers. In certain embodiments, the ink compositions may have a viscosity ranging from about 5,000 centipoise (cP) to about 300,000 cP at 25° C., or, for example, a viscosity greater than about 5,000 cP at 25° C. In certain exemplary embodiments, the at least one pigment is present in an amount of at least about 15% by weight, based on the total weight of the ink composition, and in certain embodiments, the at least one pigment may be chosen from carbon black.

In certain exemplary embodiments, the at least one hyperbranched oligomer may be chosen from polyester acrylates, such as a polyester acrylate having a functionality of about 16. In certain embodiments, the at least one hyperbranched oligomer may be present in the ink composition in an amount of about 10%, and in certain embodiments, the at least one photoinitiator may be present in the ink composition in an amount of about 5%.

In yet other embodiments there is disclosed method of printing using a variable data digital lithographic printing device comprising applying an ink composition to a reimageable surface of an imaging member; pre-curing the ink composition and transferring the ink composition from the reimageable surface to a substrate, wherein the ink composition comprises at least one hyperbranched oligomer present in an amount ranging from about 3% to about 20%, or from about 5% to about 10%, and having a functionality ranging from about 6 to about 40, or from about 10 to about 20; at least one pigment present in an amount of at least about 10%; and at least one photoinitiator present in an amount ranging from about 5% to about 10%.

In the methods disclosed herein, the at least one hyperbranched oligomer may be chosen from polyester acrylates, and the ink composition may have a viscosity ranging from about 5,000 cP to about 300,000 cP at 25° C. In certain exemplary embodiments, the pre-curing of the ink composition may be performed at a UV wavelength ranging from about 200 nanometers to about 450 nanometers. According to the methods disclosed herein, in certain embodiments, the methods may comprise applying a dampening fluid, such as octamethylcyclotetrasiloxane, to the reimageable surface of the imaging member before applying the ink composition. In certain embodiments, the ink composition may have a transfer efficiency to the substrate of about 100%, and in certain exemplary embodiments, the substrate may be chosen from paper, plastic, and metal.

It is to be understood that both the foregoing general description and the following detailed description are exemplary and explanatory only and are not restrictive of the present teachings, as claimed. Additional goals and advantages will become more evident in the description of the figures, the detailed description of the disclosure, and the claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
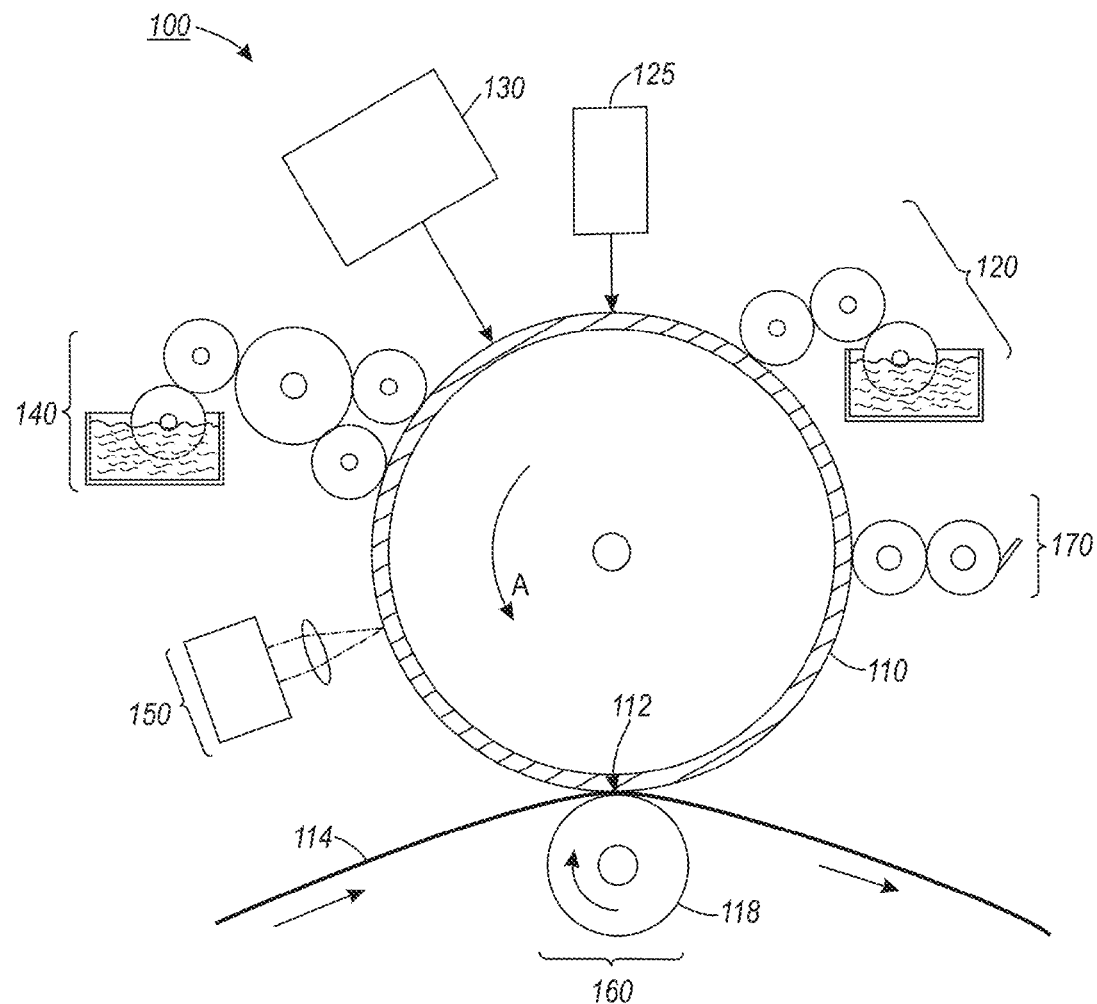
FIG. 1 illustrates a variable image digital printing system with which acrylate ink compositions comprising at least one hyperbranched oligomer according to this disclosure may be used.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "one or more of" with respect to a listing of items such as, for example, A and B, means A alone, B alone, or A and B. The term "at least one of" is used to mean one or more of the listed items can be selected.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof. For example, while the embodiments below are described in view of the printing system illustrated in FIG. 1, it should be understood that embodiments of the acrylate ink compositions described herein may also be used with other compatible printing systems.

Ink compositions in accordance with embodiments recited herein are suitable for ink-based digital printing. "Variable data lithography printing," or "ink-based digital printing," or "digital offset printing," as these terms may be used throughout this disclosure, refer to lithographic printing of variable image data for producing images on a substrate that are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system or digital offset printing system. A "variable data lithography system" is a system that is configured for lithographic printing using lithographic inks and based on digital image data, which may vary from one image to the next.

By way of example, an ink-based digital printing system with anilox roll ink delivery subsystem that may be used with embodiments of the acrylate ink compositions herein is described in U.S. patent application Ser. No. 13/095,714. U.S. patent application Ser. No. 13/095,714 ("714 application"), titled "Variable Data Lithography System," filed on Apr. 27, 2011, by Timothy Stowe et al., which is commonly assigned, and the disclosure of which is hereby incorporated by reference herein in its entirety, describes an exemplary variable data lithography system for ink-based digital printing in FIG. 1.

A general description of the exemplary printing system 100 shown in FIG. 1 is provided below. Additional details regarding individual components and/or subsystems shown in the exemplary system 100 of FIG. 1 may be found in the 714 Application.

As illustrated in FIG. 1, a printing system 100 may include an imaging member 110. While the imaging member 110 is illustrated in FIG. 1 as a drum, in other embodiments, the imaging member 110 could also be embodied as a plate, belt, or another now known or later developed configuration. The imaging member 110 includes a reimageable surface that may be formed of materials including, for example, a class of materials commonly referred to as silicones, including polydimethylsiloxane (PDMS), among others. For example, silicone, fluorosilicone, and/or fluoroelastomer may be used to form the reimageable surface of the imaging member 110. The reimageable surface may be formed of a relatively thin layer over a mounting layer, a thickness of the relatively thin layer being selected to balance printing or marking performance, durability, and manufacturability.

In some embodiments, the imaging member 110 is used to apply an inked image to an image receiving media substrate 114 at a transfer nip 112. The transfer nip 112 may be formed by an impression roller 118, as part of an image transfer mechanism 160, exerting pressure in the direction of the imaging member 110. Image receiving medium substrate 114 should not be considered to be limited to any particular composition, such as; for example, paper, plastic, metal, or composite sheet film. The exemplary printing system 100 may be used for producing images on a wide variety of image receiving media substrates 114. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The exemplary printing system 100 may include a dampening fluid system 120 generally comprising a series of rollers, which may be considered as dampening rollers or collectively as a dampening unit, for uniformly wetting the reimageable surface of the imaging member 110 with dampening fluid. One purpose of the dampening fluid system 120 is to deliver a layer of dampening fluid, generally having a uniform and controlled thickness, to the reimageable surface of the imaging member 110. A dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Extensive experimentation has found that a preferred dampening fluid may be D4 (octamethylcyclotetrasiloxane). Other suitable dampening fluids are disclosed, by way of example, in U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110 by the dampening fluid system 120, a thickness of the dampening fluid may be measured using a sensor 125 that may provide feedback to control the metering of the dampening fluid onto the reimageable surface of the imaging member 110 by the dampening fluid system 120.

After an amount of dampening fluid is provided by the dampening fluid system 120 on the reimageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface of the imaging member 110. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a pre-cure or rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the image receiving media substrate 114 is passed through a nip 112 between the imaging member 110 and an impression roller 118 such that the ink within the voids of the reimageable surface of the imaging member 110 is brought into physical contact with the image receiving media substrate 114. With the adhesion of the ink having been modified by the rheology control system 150, or the adhesion of the ink promoted based on a composition of the ink, adhesion of the ink may cause the ink to adhere to the image receiving media substrate 114 and to separate from the reimageable surface of the imaging member 110. Careful control of the rheology of the ink through composition or other means, as well as temperature and pressure conditions at the transfer nip 112, may allow, or otherwise facilitate, transfer efficiencies for the ink from the reimageable surface of the imaging member 110 to the image receiving media substrate 114 to exceed 95%. While it is possible that some dampening fluid may also wet the image receiving media substrate 114, the volume of such a dampening fluid will be minimal, and will rapidly evaporate or be absorbed by the image receiving media substrate 114.

In certain offset lithographic systems, it should be recognized that an offset roller, not shown in FIG. 1, may first receive the inked image pattern and then transfer the inked image pattern to a substrate according to a known indirect transfer method.

Following the transfer of a high percentage of the ink to the image receiving media substrate 114, residual ink and/or residual dampening fluid should be removed from the reimageable surface of the imaging member 110, preferably without scraping or wearing the reimageable surface. For example, an air knife may be employed to remove residual dampening fluid and/or ink. It is anticipated, however, that some amount of ink residue may remain on the reimageable surface. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, in some embodiments cleaning of the residual ink and dampening fluid from the reimageable surface of the imaging member 110 is needed to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may preferably be formed of a polymeric elastomer, such as silicone rubber and/or fluorosilicone rubber. The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The digital offset ink must be compatible with materials with which it is intended to come in contact, including the imaging plate (reimageable surface of the imaging member) and various dampening fluids, as well as printable substrates such as paper, metal, or plastic. The digital offset ink must also meet all functional requirements of the subsystems as imposed by wetting and transfer properties defined by subsystem architecture and materials sets.

In some embodiments, inks formulated for ink-based digital printing, or digital offset inks, are different in many ways from inks developed for other printing applications, including pigmented solvent inks, offset inks, flexography inks, UV gel inks, and the like. For example, digital offset inks contain much higher pigment loading, such as up to ten times more pigment loading, leading to higher viscosities at room temperature than other inks, which can make ink delivery by way of an anilox roller system difficult. In some embodiments, digital offset inks should not cause the imaging member (reimageable) surface, which may be a silicone, fluorosilicone, or VITON-containing imaging plate or blanket, to swell and should be compatible with dampening fluid options.

Disclosed herein are offset inks comprising at least one hyperbranched oligomer, such as an acrylate or methacrylate oligomer, with a functionality ranging from about 10 to about 20, such as a functionality of about 10, about 16, or about 20. Examples of hyperbranched oligomers as disclosed herein are shown below in Formulae I and II:

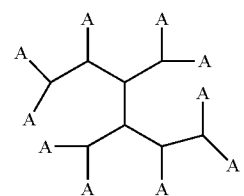

Formula I

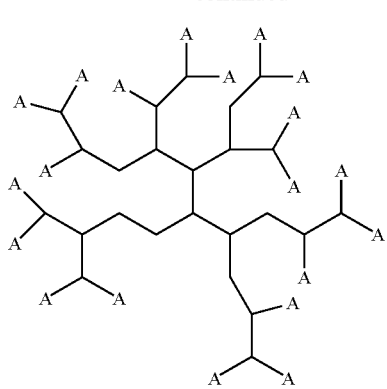

Formula II wherein A represents an acrylate group as shown below:

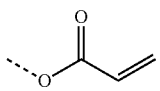

or wherein A represents a methacrylate group as shown below:

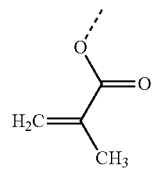

and wherein the linear and branched segments may be chosen from various groups, including alkyl, ether, branched ether, ester, branched ester, amide, azine, triazine, isocyanurate, and tris-isocyanurate groups.

In certain embodiments disclosed herein, the hyberbranched oligomers may be chosen, for example from polyester acrylates. In various exemplary embodiments, the hyperbranched oligomers may be chosen, for example, from CN2300 (acrylate functionality=8), CN2301 (acrylate functionality=9), CN2302 (acrylate functionality=16), CN2304 (acrylate functionality=18) available from Sartomer Company, Inc.; Etercure 6361-100 and Etercure 6362-100 available from Eternal Chemical Co., Ltd.; and Viscoat V#1000 (acryloyl functionality=14) and Viscoat V#1020 (acryloyl functionality=14) available from Osaka Organic Chemical Ind. Ltd.

In certain embodiments, at least one hyperbranched oligomer may be present in the ink compositions disclosed herein in an amount ranging from about 1% to about 80%, such as about 2% to about 20%, or about 5% to about 10%, by weight relative to the total weight of the ink composition. In certain embodiments, the at least one hyperbranched oligomer is present in the ink composition in an amount of about 10% by weight, relative to the total weight of the ink composition.

In certain embodiments, the ink compositions comprising at least one hyperbranched oligomer as disclosed herein may enable faster, more efficient cure. It is noted that as the functionality of the hyperbranched oligomer increases, the curing rate also generally increases, as does the hardness of the cured ink. If the functionality of the hyperbranched oligomer is too high, however, an undesirable amount of shrinkage may occur, resulting in deformation of the resultant image. As will be appreciated by those skilled in the art, a rapid cure rate may correspond to the ability to perform high speed printing applications. Furthermore, the ink compositions disclosed herein allow for rapid, efficient curing by generating less energy and heat than curing of traditional inks (i.e., ink compositions that do not comprise at least one hyperbranched oligomer).

In certain embodiments, the ink may be partially cured in a pre-cure step by application of ultra-violet (UV) wavelength ranging from about 200 nanometers to about 450 nanometers, such as about 360 nanometers to about 450 nanometers. In certain embodiments, the partial curing of the ink by UV light may be performed by exposing the ink to UV light from a UV LED array. In certain other embodiments, the heating may partial cure the ink. The ink may or may not be photocurable, such as by exposure to UV or non-UV wavelengths. For non-UV offset inks cured by heat, a focused infrared (IR) lamp may be used to increase ink cohesion, optionally with wavelength-appropriate photoinitiators introduced into the ink. Non-limiting examples of other curing methods may include drying, chemical curing initiated through the application of energy other than UV and IR radiation, and multi-component chemical curing. The more quickly the ink may cure, due at least in part to the ink composition comprising at least one hyperbranched oligomer, the less energy in the form of UV radiation and subsequent cooling needs to be applied to the system.

In certain embodiments using digital offset printing processes, partial curing of the ink with UV light before transfer from the plate to the substrate has been shown to bring transfer efficiency to 100%, and sharpen the image quality of the print, which can be made from paper, plastic or metal. The ink on the object may be exposed again to UV light for a final curing of the ink.

While not wishing to be bound by theory, it is believed that due to the globular nature and relatively high functionality of the hyberbranched oligomers disclosed herein, properties of the resulting inks comprising hyperbranched oligomers may differ from other ink compositions, including other variable data digital lithography ink compositions. For example, in certain embodiments, hyperbranched oligomers may enable a lower viscosity range, while maintaining a high crosslinking efficiency and, when formulated correctly, yield ink formulations with increased adhesion latitude to substrates including metal, such as aluminum, and plastics, such as polyethylene terephthalate (PET). While shrinkage of the applied ink image normally ranges from about 10% to about 30% upon curing ink, shrinkage of ink compositions as disclosed herein comprising at least one hyperbranched oligomer may, in certain embodiments, be about 10%, such as less than about 10%, about 5%, or less than about 5%. In certain exemplary embodiments, the ink compositions disclosed herein may optionally further comprise at least one non-hyperbranched viscoelastic oligomer that may serve to adjust ink viscosity and tack.

During pre-cure of the ink in the print process, low shrinkage of the ink on the blanket surface is preferred. This is because shrinkage before pinning of ink on the paper/substrate can lead to non-uniformity of ink across the print. Non-uniformity on the final print can also occur with shrinkage, especially when printing on smooth or polymeric surfaces, where ink pinning is more challenging.

In certain embodiments, the inks disclosed herein comprising at least one hyperbranched oligomer may have enhanced resistance to polar solvents, as compared to traditional ink compositions that do not comprise hyperbranched oligomers. An enhanced resistance to solvents may indicate how well or how much an ink has cured. Therefore, an ink that has a high polar solvent resistance may have cured well and/or thoroughly. As used herein, "Double MEK Rub," refers to solvent rub test performed to evaluate for solvent resistance. The test method is used to determine the degree of cure of an ink by the ink resistance to a specified solvent. The solvent rub test usually is performed using methyl ethyl ketone (MEK) as the solvent, and involves rubbing the surface of a substrate containing the ink with a soft applicator soaked with MEK until failure or breakthrough of the ink occurs. The type of applicator, the stroke distance, the stroke rate and approximate applied pressure of the rub may be specified. The rubs are counted as a double rub (one rub forward and one rub backward constitutes a double rub). In general, the greater the number of MEK rubs, the greater the degree of cure. In certain embodiments, the ink compositions disclosed herein comprising at least one hyperbranched oligomer may have an double MEK rub value of at least about 50, such as at least about 60, at least about 70, or at least about 80. In certain embodiments, the ink compositions comprising at least one hyperbranched oligomer may have a better solvent resistance, and therefore a high double MEK rub value, than comparable ink compositions that do not comprise at least one hyperbranched oligomer.

Due to their globular structure, hyperbranched oligomers may have the ability to maintain a lower viscosity for ink delivery, while minimizing shrinkage during pre-cure and final cure. The ability to reduce the viscosity may be useful in maintaining a more desirable viscosity of the ink compositions disclosed herein, given the naturally high viscosity that may result from the higher pigment loading of the ink compositions. The presence of hyperbranched oligomers in the ink compositions disclosed herein may also reduce the required application of laser powder during the pre-cure process.

The ink compositions disclosed herein comprising at least one hyperbranched oligomer may have a viscosity ranging from about 5,000 centipoise (cP) to about 300,000 cP at 25° C. and a shear rate of 5 sec$^{-1}$, such as a viscosity ranging from about 15,000 cP to about 250,000 cP. In certain embodiments, the ink compositions disclosed herein may have a viscosity ranging from about 2,000 cP to about 90,000 cP at 25° C. and a shear rate of 50 sec$^{-1}$, such as a viscosity ranging from about 5,000 cP to about 65,000 cP. The shear thinning index, or SHI, is defined in the present disclosure as the ratio of the viscosity of the ink composition at two different shear rates, here 50 sec$^{-1}$ and 5 sec$^{-1}$. This may be abbreviated as SHI (50/5). In certain embodiments, the SHI (50/5) may range from about 0.10 to about 0.60 for the ink compositions disclosed herein comprising at least one hyperbranched oligomer, such as from about 0.35 to about 0.55. These ink compositions may also have a surface tension of at least about 25 dynes/cm at 25° C., such as a surface tension ranging from about 25 dynes/cm to about 40 dynes/cm at 25° C. Conventional offset inks usually have a viscosity above 50,000 cP, which may be too high to use with nozzle-based inkjet technology.

In certain embodiments disclosed herein, a small percentage of low molecular weight monomer may be added to the ink or a lower viscosity oligomer may be used in the ink formulation. Use of a low molecular weight monomer and/or a lower viscosity oligomer can, for example, help obtain improved initial ink flow. Curing of a UV ink to perform a partial cross linking UV cure following application of the ink over reimageable surface layer may thereafter increase the cohesiveness and viscosity of the ink while it resides over reimageable surface layer. Alternatively, the ink may be applied onto the reimageable surface at a first, warm temperature (at which the viscoelastic modulus of the ink/marking material is sufficiently low to ensure its defect-free transfer to the reimageable surface), and then be cooled on the reimageable surface between the point of heating and the point of transfer to the substrate to achieve a temperature that is low enough to ensure a sufficiently high viscoelastic modulus to resist splitting.

Another alternative to increase the cohesion of the ink is to include a low molecular weight additive (such as a solvent) in the ink composition to escape from the ink while it is on the reimageable surface layer. In this embodiment, the rheology of the ink may be actively manipulated by adjusting the amount of solvent (e.g., organic solvents, isopar, or any other "viscosity reducer" liquids) contained within the ink, for example, through addition of an appropriate solvent prior to the ink transfer from the ink donor roll to the reimageable surface, followed by removal (e.g., through evaporation and/or absorption into a carrier gas such as air) of the desired amount of the solvent from the ink layer on the reimageable surface prior to transfer of the ink from the reimageable surface to the substrate. It is understood that the higher solvent content within the ink prior to transfer to the reimageable surface would reduce its viscoelastic modulus to the extent necessary to form a defect-free layer of the desired thickness on the image areas of the reimageable surface. Similarly, it is understood that the lower solvent content within the ink immediately prior to transfer to the substrate would increase the ink viscoelastic modulus to the extent necessary to enable the ink layer to resist splitting during the transfer from the reimageable surface to the substrate, thereby leaving a clean reimageable surface that requires minimal post-transfer cleaning, as described above.

In addition to the at least one hyperbranched oligomer, the ink compositions disclosed herein may further comprise other additional ingredients. For example, in certain embodiments the ink compositions disclosed herein may comprise at least one pigment, at least one acrylate monomer and/or polymer, at least one dispersant, at least one rheology modifier, at least one photoinitiator, and/or at least one UV stabilizer.

Acrylates or propenoates are salts and esters of acrylic acid. Acrylate and methacrylate monomers are understood to contain reactive vinyl functional groups that facilitate formation of acrylate polymers. Exemplary acrylates may include acrylate monomers or polymers, such as trifunctional monomers, for example, Sartomer SR501 and SR9035, and polyester acrylates Sartomer CN294E, Sartomer CD 501, and Sartomer CN 2256. In particular, exemplary acrylates inks possess polar functional groups, but are substantially non-polar along the monomeric or oligomeric backbone to the extent that they are non-miscible in water without surfactant.

In certain embodiments, the at least one acrylate may be present in the ink composition in an amount ranging from about 10% to about 80%, such as from about 40% to about 80%, or about 60%.

In addition to the at least one hyperbranched oligomer, the ink compositions disclosed herein may further comprise at least one pigment. Suitable pigments may include any pigments known in the art, including black pigments, white pigments, cyan pigments, magenta pigments, yellow pigments, and the like. Further, pigments may be organic or inorganic particles. Suitable inorganic pigments may include carbon black. However, other inorganic pigments may be suitable such as titanium oxide, cobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. In certain embodiments, Ciba IRGALITE Blue GLO may be use as the pigment.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigments may be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, Orion Engineered Carbons, and E.I. DuPont de Nemours and Company. Suitable carbon black pigments include, without limitation, Nipex 150 (available from Orion Engineered Carbons), Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. In some embodiments, the pigment particle size is desired to be as small as possible to enable a stable colloidal suspension of the particles in the liquid vehicle, for example.

The at least one pigment may be present in the ink compositions disclosed herein in an amount of at least about 8%, such as at least about 10%, at least about 15% or at least about 17%.

In some embodiments, the ink compositions disclosed herein may further comprise at least one surfactant. For example, the ink composition may comprise at least one water-dispersible silicone surfactant such as SILSURF A004-AC-UP (available from Siltech Corporation).

In some embodiments, the ink compositions disclosed herein may further comprise at least one dispersant. The dispersants may include polymeric dispersants, such as those from Lubrizol including SOLSPERSE 32000, SOLSPERSE 39000, SOLSPERSE 71000, SOLSPERSE J-100, SOLSPERSE J-200, SOLSPERSE X300, and from BASF, such as EFKA 4300, EFKA 4330, EFKA 4340, EFKA 4400, EFKA PX 4701, EFKA 4585, EFKA 5207, EFKA 6230, EFKA 7701, EFKA 7731, and from Tego, such as TEGO Dispers 656, TEGO Dispers 685, TEGO Dispers 710, and from King Industries, such as K-SPERSE A-504. In certain embodiments, the at least one dispersant may be present in the ink composition in an amount ranging from about 2% to about 10%, such as about 3% to about 7% or from about 5%.

In some embodiments, the ink compositions disclosed herein may further comprise at least one rheology modifier. Exemplary rheology modifiers may be modified or unmodified inorganic compounds including organoclays, attapulgite clays and bentonite clays, including tetraalkyl ammonium bentonites as well as treated and untreated synthetic silicas. Suitable organoclays include from Southern Clay Products CLAYTONE HA and CLAYTONE HY. Suitable examples of tetraalkyl ammonium bentonites include from Celeritas Chemicals CELCHEM 31743-09, CELCHEM 31744-09, and CELCHEM 31745-09. Other exemplary rheology modifiers include organic compounds such as EFKA RM1900 and EFKA RM1920, both modified hydrogenated castor oils from BASF. In certain embodiments, the at least one rheology modifier may be present in the ink composition in an amount ranging from about 0.01% to about 5%, such as at least 0.01%.

In some embodiments, the ink compositions disclosed herein may comprise at least one photoinitiator. Photoinitiators may be liquid- or solid-based or combinations thereof. Suitable Type I photoinitiators include those from classes of dialkoxy-aceto-pheonones, dialkoxy-alkyl-pheonones, amino-alkyl-pheonones, and acyl-phosphine oxides. Suitable Type II photoinitiators include those from classes of benzophenones and thioxanthones, which require activation from suitable amine synergists. Exemplary photoinitiators include ADDITOL LX, ADDITOL DX, ADDITOL BDK, ADDITOL CPK, ADDITOL DMMTA, ADDITOL TPO from Allnex, Esacure 1001M from IRGACURE 127, IRGACURE 184, IRGACURE 379, IRGACURE 819 and IRGACURE 2959 from BASF. Exemplary amine synergists that are used with Type II photoinitiators include SPEEDCURE PDA, SPEEDCURE EDB from Lambson, Diethylaminoethyl Methacrylate, Ethyl-4-dimethylamino benzoate, 2-Ethylhexyl 4-dimethylamino benzoate from Esstech, Inc. In some embodiment, the acrylate ink composition may include low odor photoinitiators, such as, ESACURE KIP 150 available from Lamberti S.p.A.

In certain embodiments, the at least one photoinitiator may be present in the ink composition in an amount ranging from about 1% to about 10%, such as about 5% to about 10%, less than about 5%, or about 5%. In certain embodiments, the at least one photoinitiator is present in an amount of less than about 10%, such as about 5%.

In some embodiments, the ink compositions disclosed herein may comprise at least one UV stabilizer. For example, the UV stabilizers may include Sartomer USA CN3216 and BASF IRGASTAB UV22. In certain embodiments, at least one UV stabilizer may be present in the ink composition in an amount of at least about 0.001%, such as at least about 0.01% to about 1%.

Ink compositions in accordance with the embodiments described herein may be formed by preparing an ink base and mixing it with the desired amount of at least one hyperbranched oligomer and at least one photoinitiator. In certain embodiments, the at least one hyperbranched oligomer and at least one photoinitiator may be mixed with the ink base together with stirring at an increased temperature, such as at least about 65° C. or at least about 70° C., and for a time period to ensure complete dissolution of the at least one photoinitiator, such as at least about 1 hour or at least about 2 hours.

Methods of printing with ink compositions as disclosed herein having enhanced controlled dimensional change and low energy curing properties may include applying the ink composition onto a reimagable surface of an imaging member having, for example, a dampening fluid applied thereon. In certain embodiments, the methods may include pre-curing the ink composition and transferring the ink composition from the reimagable surface area to a substrate.

Aspects of the present disclosure may be further understood by referring to the following examples. The examples are illustrative, and are not intended to be limiting embodiments thereof. Example 1 describes the preparation of an ink base without a photoinitiator. Comparative Examples 2-5 illustrate a process of making an ink composition using the acrylate ink base of Example 1 without a hyperbranched oligomer. Examples 6 and 7 illustrate a process of making ink compositions using the acrylate ink base of Example 1 with varying weight percentages of hyperbranched oligomer and photoinitiator.

EXAMPLES

Part I—Preparation of Inks

Example 1—Preparation of Ink without Photoinitiators

In a 1000 mL stainless steel beaker were added 391.92 g of CN294E from Sartomer Corporation, 33.12 g of SR501 from Sartomer Corporation, 36.0 g of Solsperse® 32000 from The Lubrizol Corporation, and 6.3 g of CN3216 from Sartomer Corporation. The vessel was placed on a heating mantle, available from IKA® equipped with a thermocouple and stirrer apparatus also available from IKA® and with an anchor impeller. The vessel was heated to 82° C. with the impeller stirring at 100 RPM with gradually higher revolution speed applied to 500 RPM as the ink base components were also heated up. At that time, 120.0 g of Mogul® E carbon black pigment, from Cabot Corporation, were added slowly with the mixture allowed to stir for an hour, upon which 12.66 g of Claytone® HY organoclay, available from Southern Clay Products, was added and allowed to stir for another 30 minutes. The vessel containing the mixed components was transferred to a high speed shearing mill available from the Hockmeyer Equipment Corporation equipped with a 40 mm diameter high shear Cowles blade which was then stirred at 5300 RPM for about an hour to form COMPONENT MIXTURE 1A. The thoroughly mixed component mixture was then qualitatively transferred to a 3-roll mill apparatus manufactured by Kent Machine Works where COMPONENT MIXTURE 1A was passed through the 3-roll mill first at an input apron roll speed of 400 RPM for the first pass and then at an input apron roll speed of 200 RPM for the second to form COMPONENT MIXTURE 1B.

Comparative Example 2 Ink

In a 100 mL beaker was added 37.63 g of the Example 1 ink and while stirring with impeller at 200 RPM at about 70° C. were added 0.86 g Irgacure® 819, 0.60 g Irgacure® 379, both available from Sartomer USA LLC, and 1.56 g Esacure® KIP 150 available from Lamberti S.p.A. The ink was stirred for 2 hours at about 70° C. to ensure dissolution of the photoinitiators.

Comparative Example 3 Ink

In a 100 mL beaker was added 37.63 g of the Example 1 ink and while stirring with impeller at 200 RPM at about 70° C. were added 1.78 g Irgacure® 819 and 1.24 g Irgacure® 379, both available from Sartomer USA LLC. The ink was stirred for 2 hours at about 70° C. to ensure dissolution of the photoinitiators.

Comparative Example 4 Ink

In a 100 mL beaker was added 40.85 g of the Example 1 ink and while stirring with impeller at 200 RPM at about 70° C. was added 2.15 g Additol® DX available from Cytec Industries Inc. The ink was stirred for 2 hours at about 70° C. to ensure dissolution of the photoinitiators.

Comparative Example 5 Ink

In a 100 mL beaker was added 39.78 g of the Example 1 ink and while stirring with impeller at 200 RPM at about 70° C. were added 3.23 g ADDITOL DX available from Cytec Industries Inc. The ink is stirred for 2 hours at about 70° C. to ensure dissolution of the photoinitiators.

Example 6

In a 100 mL beaker was added 36.55 g of the Example 1 ink and while stirring with impeller at 200 RPM at about 70° C. were added 2.15 g Additol® DX available from Cytec Industries Inc. and 4.30 g CN2302 hyperbranched acrylate available from Sartomer USA LLC. The ink was stirred for 2 hours at about 70° C. to ensure dissolution of the photoinitiators.

Example 7

In a 100 mL beaker was added 36.47 g of the Example 1 ink and while stirring with impeller at 200 RPM at about 70° C. were added 4.38 g Additol® DX available from Cytec Industries Inc. and 2.15 g CN2302 hyperbranched acrylate available from Sartomer USA LLC. The ink was stirred for 2 hours at about 70° C. to ensure dissolution of the photoinitiators.

Part II—Characterization of Ink Transfer Prints

Hand Transfer of Inks onto Substrate and Radiation Curing: Each of the inks was transferred onto XEROX Digital Color Elite Gloss (DCEG) paper at different densities such that the resultant visible optical densities range between about 1.9 to about 2.1 and such that the L* brightness of the transferred images range between about 8 and about 10 after having been cured using a Fusion UV Lighthammer L6 curing station equipped with D bulb and such that the applied energy doses for UVV, UVA, UVB, and UVC bands were 640, 1401, 420 and 37 mJ/cm$^2$, respectively. The print image dimensions were on the order of 2 cm by 3 cm.

MEK Rub Testing:

A soft applicator dipped in Methylethyl ketone (MEK) solvent at room temperature was spread evenly (about 2 cm) across each of the images on DCEG paper using constant pressure with fresh MEK being re-applied onto the applicator every 5 double MEK rubs. The number of MEK double rubs required before the paper substrate became visible was recorded with the number of double MEK rubs normalized to constant L*=9 with the summary of results shown below in Table 1.

Figure 3:
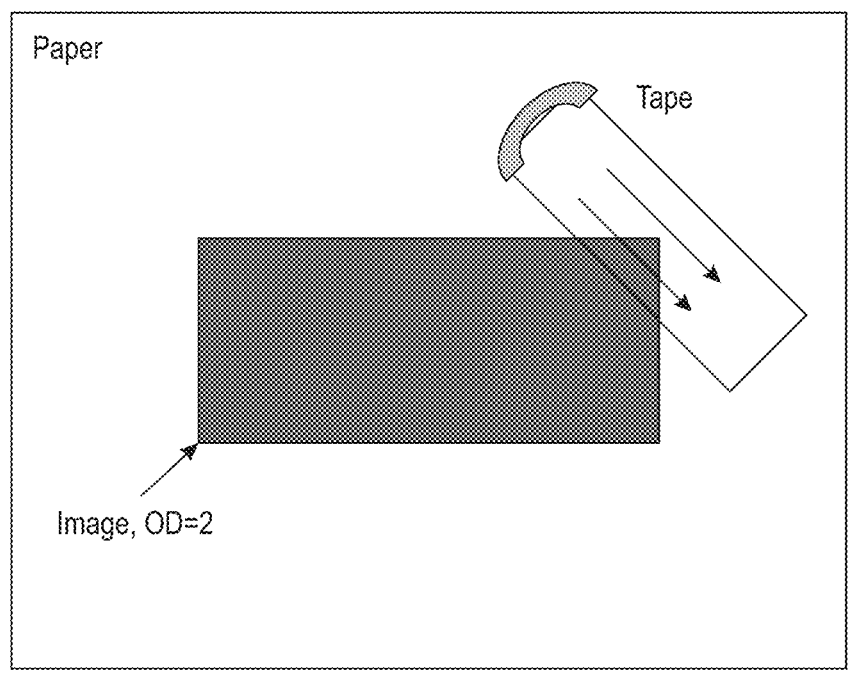
FIG. 3 is a depiction of the tape test as described in the Example section below and performed on the ink compositions for Comparative Examples 2-5 and Examples 6 and 7.

Tape Testing:

A tape test, as depicted in FIG. 3, was performed with Scotch™ brand 810D MagicTape available from 3M. A piece of tape was affixed to a corner of a cured image and paper such that the overlapping tape was about 4 mm on top of the image at its longest degree of overlapping and on about a 45 degree angle relative to the orthoganol rectangular image. With this configuration, there was about 1.4 times as much image edge-paper boundary with the tape compared to the image-only tape boundary representing a good stress test for adhesion of the image on paper. The tape was placed on the image and paper as previously described and then pressed firmly back and forth 5 times. The tape was pulled off slowly (about 3 cm/s) from the paper and each of the images generated from the inks with the results recorded. Using a fresh piece of tape, the tape test was repeated using a pull rate about 5 times faster than the slower rate tape pull test. The qualitative results of both pull rates are shown below in Table 1. A pass rating indicates no ink was pulled away from the image and embedded into the tape. A fail rating indicates at least some of the ink was removed from the image and was embedded into the tape. A "Peel" rating indicates that the entire or substantial portion of taped-over image was peeled away with the tape.

TABLE 1

Number of Double MEK Rubs for Normalized L* = 9 Transfer Prints and Scotch Tape Test Results

| Property | Example 1 | Comp. Example 2 | Comp. Example 3 | Comp. Example 4 | Comp. Example 5 | Example 6 | Example 7 |
|---|---|---|---|---|---|---|---|
| Wt % Photoinitiator(s) in ink | Not applicable | 7.0 | 7.0 | 5.0 | 7.5 | 5.0 | 10.0 |
| Wt % CN2302 in ink | Not applicable | 0 | 0 | 0 | 0 | 10.0 | 5.0 |
| Number of double MEK rubs | Not applicable | 35 | 54 | 25 | 44 | 82 | 44 |
| Tape test (slow pull) | Not applicable | Pass | Pass | Fail | Pass | Pass | Pass |
| Tape test (fast pull) | Not applicable | Fail | Fail | Peel | Fail | Pass | Fail |

Figure 2:
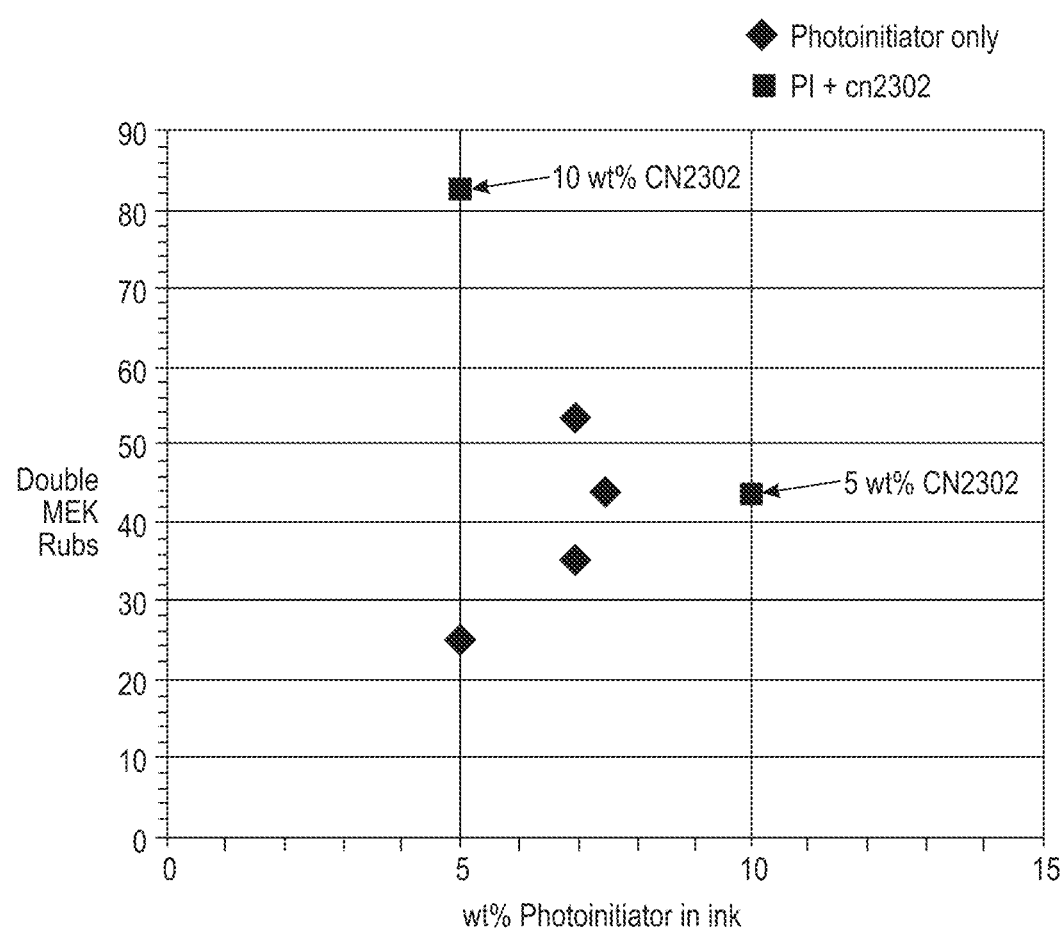
FIG. 2 is a graph illustrating the relationship between the number of double methylethyl ketone rubs and the amount of photoinitiator or photoinitiators in the ink compositions according to Comparative Examples 2-5 and Examples 6 and 7.

The results in Table 1 show the effects of the presence of the hyperbranched acrylate polymers as well as the effect of the level of photoinitiator with regard to the level of MEK rub resistance. Various photoinitiator packages between 5 wt % and 7.5 wt % levels in the inks not comprising hyperbranched acrylate yielded MEK rubs ranging from the mid 20s to the mid 50s. The incorporation of 10 wt % CN2302, a hyperbranched acrylate, and 5 wt % Additol® DX photoinitiator resulted in a cured transfer print with better MEK rub resistance such that 82 double MEK rubs were required. This represents on average a two-fold increase in the MEK rub resistance over inks not formulated with CN2302. Further, the performance was photoinitiator-level-sensitive, as too much photoinitiator added in the ink, as in the case with Example 7 ink, lead to a poorer MEK rub resistance compared to the Example 6 ink with a reversal of the percentages of Additol® DX and CN2302 by weight. The results are also graphically displayed in FIG. 2. As shown in FIG. 2, the ink composition comprising both photoinitiator and 10 wt % photoinitiator exhibited superior solvent resistance, demonstrating an MEK rub resistance of 82.

In certain embodiments, it may be preferable to have ink formulations comprising as little photoinitiator as possible that will still afford good cure but also provide further benefit for cost, safety, and chemical and physical resistance properties.

The MEK rub results depicted graphically in FIG. 2 again allude to both the importance of the presence of the hyperbranched acrylate oligomers as well as the ratio of hyperbranched acrylate oligomers to photoinitiator in ink composition. Too little hyperbranched acrylate oligomers formulated with too much photoinitiator (as in Example 7 containing 10 wt % Additol® DX and 5 wt % CN2302) may offers less advantage for cure, as shown by the results of the MEK rub resistance, compared to formulations not containing CN2302 and may actually add to the overall cost of the ink, in addition to potentially degrading the safety of the cured ink formulation.

What is claimed is:

1. An ink composition comprising:
   at least one hyperbranched oligomer present in an amount ranging from about 3 wt % to about 20 wt % and having a functionality ranging from about 10 to about 20;
   at least one pigment present in an amount of at least 10%;
   at least one photoinitiator present in an amount ranging from about 5% to about 10%; and
   at least one rheology modifier chosen from organoclays, attapulgite clays and bentonite clays,
   wherein the ink composition has a viscosity ranging from about 5,000 cP to about 300,000 cP at 25° C. and a shear rate of 5 sec$^{-1}$, and
   wherein the ink is a digital offset ink.

2. The ink composition of claim 1, further comprising at least one ingredient chosen from acrylate monomers, dispersants, and UV stabilizers.

3. The ink composition of claim 1, wherein the at least one pigment is present in an amount of at least 15% based on the total weight of the ink composition.

4. The ink composition of claim 1, wherein at least one pigment is a black pigment.

5. The ink composition of claim 1, wherein the at least one hyperbranched oligomer is chosen from polyester acrylates.

6. The ink composition of claim 1, wherein the at least one hyperbranched oligomer has a functionality of 16.

7. The ink composition of claim 1, wherein the at least one hyperbranched oligomer is chosen from polymers of Formulae I and II:

Formula I

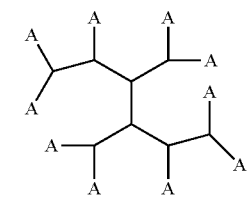

Formula II

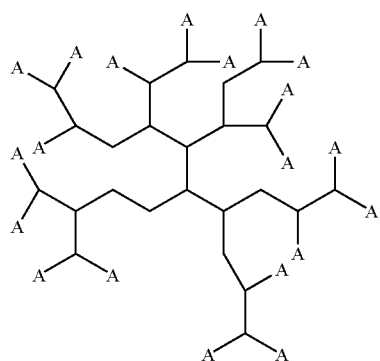

wherein A is an acrylate group

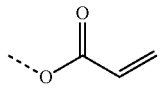

or a methacrylate group

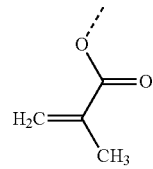

and the linear and branched segments are chosen from alkyl, ether, branched ether, ester, branched ester, amide, azine, triazine, isocyanurate, and tris-isocyanurate groups.

8. The ink composition of claim 1, wherein the at least one hyperbranched oligomer is present in the ink composition in an amount of about 5 wt % to about 10 wt %.

9. The ink composition of claim 1, wherein the at least one pigment is chosen from black pigments, red pigments, blue pigments, cyan pigments, magenta pigments and yellow pigments.

10. The ink composition of claim 1, wherein the at least one pigment is not a white pigment.

11. The ink composition of claim 1, wherein the ink composition has a double methyl ethyl ketone (MEK) rub test value of at least 70 rubs.

12. An ink composition comprising:
    at least one hyperbranched oligomer present in an amount ranging from about 3 wt % to about 20 wt % and having a functionality ranging from about 10 to about 20;
    at least one pigment present in an amount of at least 10%;
    at least one photoinitiator present in an amount ranging from about 5% to about 10%; and
    at least one rheology modifier chosen from organoclays, attapulgite clays, bentonite clays, and modified hydrogenated castor oils,
    wherein the ink composition has a viscosity ranging from about 5,000 cP to about 300,000 cP at 25° C. and a shear rate of 5 sec$^{-1}$, and
    wherein the ink is a digital offset ink.

13. The ink composition of claim 12, wherein the at least one pigment is chosen from black pigments, red pigments, blue pigments, cyan pigments, magenta pigments and yellow pigments.

14. The ink composition of claim 12, wherein the at least one pigment is not a white pigment.

* * * * *